US010098162B2

(12) United States Patent
Fukuta

(10) Patent No.: US 10,098,162 B2
(45) Date of Patent: *Oct. 9, 2018

(54) MOBILE COMMUNICATION SYSTEM, USER TERMINAL, BASE STATION, PROCESSOR, AND COMMUNICATION CONTROL METHOD

(71) Applicant: KYOCERA CORPORATION, Kyoto (JP)

(72) Inventor: Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/700,622

(22) Filed: Sep. 11, 2017

(65) Prior Publication Data

US 2018/0014343 A1 Jan. 11, 2018

Related U.S. Application Data

(63) Continuation of application No. 14/438,684, filed as application No. PCT/JP2013/077815 on Oct. 11, 2013, now Pat. No. 9,763,273.

(Continued)

(51) Int. Cl.
*H04W 76/14* (2018.01)
*H04W 76/02* (2009.01)
(Continued)

(52) U.S. Cl.
CPC ......... *H04W 76/023* (2013.01); *H04W 72/04* (2013.01); *H04W 76/14* (2018.02); *H04W 72/1252* (2013.01); *H04W 76/23* (2018.02)

(58) Field of Classification Search
None
See application file for complete search history.

(56) References Cited

U.S. PATENT DOCUMENTS 8,295,871 B2 10/2012 Axnas et al.
8,601,092 B2 12/2013 Hiroki
(Continued)

FOREIGN PATENT DOCUMENTS

JP 2009-516418 A 4/2009
JP 2011-009873 A 1/2011
(Continued)

OTHER PUBLICATIONS

International Search Report; PCT/JP2013/077815; dated Dec. 17, 2013.
(Continued)

*Primary Examiner* — Joseph A Bednash
(74) *Attorney, Agent, or Firm* — Studebaker & Brackett PC

(57) ABSTRACT

A base station, a processor thereof, and a communication control method thereof receive a notification from a first user terminal before starting direct device to device (D2D) communication, the notification indicating a desire for performing D2D communication, receive a measurement report including results of measurement of a cell reference signal from the first user terminal, and based on the measurement report, determine to cause the first user terminal to perform D2D communication, perform a process for starting the D2D communication between the first and second user terminals, receive a first data amount notification indicating an amount of first data to be transmitted from the first user terminal to the second user terminal, and based on the first data amount notification, allocate first radio resources to the first user terminal, where the allocated first radio resources are used by the first user terminal to transmit the first data.

6 Claims, 12 Drawing Sheets

Related U.S. Application Data

(60) Provisional application No. 61/719,604, filed on Oct. 29, 2012.

(51) Int. Cl.
*H04W 72/04* (2009.01)
*H04W 72/12* (2009.01)
*H04W 76/23* (2018.01)

(56) References Cited

U.S. PATENT DOCUMENTS

| | | | |
|---|---|---|---|
| 8,977,232 B2 | 3/2015 | Vanderveen et al. | |
| 2008/0259853 A1 | 10/2008 | Ito | |
| 2008/0318612 A1 | 12/2008 | Axnas et al. | |
| 2010/0190469 A1 | 7/2010 | Vanderveen et al. | |
| 2010/0325237 A1 | 12/2010 | Hiroki | |
| 2012/0020213 A1* | 1/2012 | Hornennan | H04W 76/043 370/231 |
| 2012/0093098 A1* | 4/2012 | Charbit | H04W 72/04 370/329 |
| 2012/0106517 A1* | 5/2012 | Charbit | H04W 72/04 370/336 |
| 2012/0176915 A1* | 7/2012 | Lee | H04W 52/241 370/248 |
| 2013/0250798 A1* | 9/2013 | Iwamura | H04W 72/0446 370/252 |
| 2013/0322413 A1* | 12/2013 | Pelletier | H04W 72/1289 370/336 |
| 2014/0023008 A1 | 1/2014 | Ahn et al. | |
| 2014/0038629 A1 | 2/2014 | Iwamura et al. | |
| 2014/0044024 A1 | 2/2014 | Zou et al. | |
| 2014/0112194 A1* | 4/2014 | Novlan | H04W 48/16 370/254 |

FOREIGN PATENT DOCUMENTS

| | | |
|---|---|---|
| JP | 2011-055221 A | 3/2011 |
| JP | 2012-119827 A | 6/2012 |
| JP | 2012-516658 A | 7/2012 |
| JP | 2013-229746 A | 11/2013 |
| WO | 2006/106634 A1 | 10/2006 |
| WO | 2010/082084 A1 | 7/2010 |
| WO | 2012/049351 A1 | 4/2012 |
| WO | 2012/091420 A2 | 7/2012 |
| WO | 2012/144320 A1 | 10/2012 |

OTHER PUBLICATIONS

3GPP TR 22.803 V0.3.0 (May 2012); 3rd Generation Partnership Project; Technical Specification Group SA; Feasibility Study for Proximity Services (ProSe)(Release 12).

An Office Action; "Notice of Reasons for Rejection," issued by the Japanese Patent Office dated Dec. 15, 2015, which corresponds to Japanese Patent Application No. 2014-544413 and is related to U.S. Appl. No. 14/438,684; with English language statement of relevance.

The extended European search report issued by the European Patent Office dated Jun. 9, 2016, which corresponds to European Patent Application No. 13851802.2-1505 and is related to U.S. Appl. No. 14/438,684.

An Office Action issued by the Japanese Patent Office dated Jun. 21, 2016, which corresponds to Japanese Patent Application No. 2014-544413 and is related to U.S. Appl. No. 14/438,684; with English language statement of relevance.

* cited by examiner

FIG.8
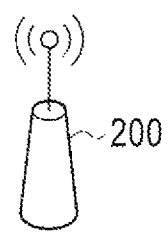
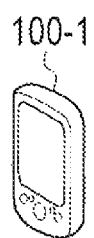 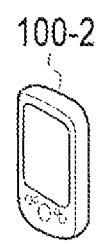

MOBILE COMMUNICATION SYSTEM, USER TERMINAL, BASE STATION, PROCESSOR, AND COMMUNICATION CONTROL METHOD

CROSS REFERENCE TO RELATED APPLICATIONS

This application is a Continuation Application of U.S. patent application Ser. No. 14/438,684 filed Apr. 27, 2015, which is the U.S. National Phase Application of International Patent Application No. PCT/JP2013/077815 filed Oct. 11, 2013, which claims benefit of U.S. Provisional Application No. 61/719,604 filed Oct. 29, 2012, the entire contents of which are incorporated herein by reference.

TECHNICAL FIELD

The present disclosure relates to a mobile communication system that supports D2D communication.

BACKGROUND ART

In a 3GPP (3rd Generation Partnership Project) which is a project aiming to standardize a mobile communication system, the introduction of Device to Device (D2D) communication is discussed as a new function after Release 12 (see non patent document 1).

In the D2D communication, a plurality of adjacent user terminals perform communication in a frequency band assigned to the mobile communication system without a core network. It is noted that the D2D communication is also called Proximity Service communication.

PRIOR ART DOCUMENT

Non-Patent Document

Non-Patent Document 1: 3GPP technical report "TR 22.803 V0.3.0" May 2012.

SUMMARY

In the current state, there is no designed specification for appropriately controlling D2D communication.

Therefore, the present disclosure provides a base station capable of appropriately controlling D2D communication, a processor thereof, and a communication control method thereof.

A base station according to the disclosure comprises a control unit comprising a processor and a memory configured to receive a notification from a first user terminal before starting D2D communication that is direct device to device communication, the notification indicating a desire for performing the D2D communication, receive a measurement report from the first user terminal, the measurement report including results of measurement of a cell reference signal, based on the measurement report, determine to cause the first user terminal to perform the D2D communication, perform a process for starting the D2D communication performed between the first user terminal and a second user terminal, receive a first data amount notification transmitted from the first user terminal, where the first data amount notification indicates an amount of first data to be transmitted from the first user terminal to the second user terminal, and based on the first data amount notification, allocate first radio resources to the first user terminal, where the first radio resources allocated to the first user terminal are used by the first user terminal to transmit the first data.

A method according to the disclosure, which is performed at a base station, comprises receiving a notification from a first user terminal before starting D2D communication that is direct device to device communication, the notification indicating a desire for performing the D2D communication, receiving a measurement report from the first user terminal, the measurement report including results of measurement of a cell reference signal, based on the measurement report, determining to cause the first user terminal to perform the D2D communication, performing a process for starting the D2D communication performed between the first user terminal and a second user terminal, receiving a first data amount notification transmitted from the first user terminal, where the first data amount notification indicates an amount of first data to be transmitted from the first user terminal to the second user terminal, and based on the first data amount notification, allocating first radio resources to the first user terminal, where the first radio resources allocated to the first user terminal are used by the first user terminal to transmit the first data.

A device comprising at least one processor and at least one memory the at least one processor according to the disclosure is configured to cause a base station to receive a notification from a first user terminal before starting D2D communication that is direct device to device communication, the notification indicating a desire for performing the D2D communication, receive a measurement report from the first user terminal, the measurement report including results of measurement of a cell reference signal, based on the measurement report, determine to cause the first user terminal to perform the D2D communication, perform a process for starting the D2D communication performed between the first user terminal and a second user terminal, receive a first data amount notification transmitted from the first user terminal, where the first data amount notification indicates an amount of first data to be transmitted from the first user terminal to the second user terminal, and based on the first data amount notification, allocate first radio resources to the first user terminal, where the first radio resources allocated to the first user terminal are used by the first user terminal to transmit the first data.

BRIEF DESCRIPTION OF THE DRAWINGS

FIG. 8 is a diagram for explaining an operation environment according to a first embodiment to a fourth embodiment.

DESCRIPTION OF THE EMBODIMENT

[Overview of Embodiment]

Figure 1:
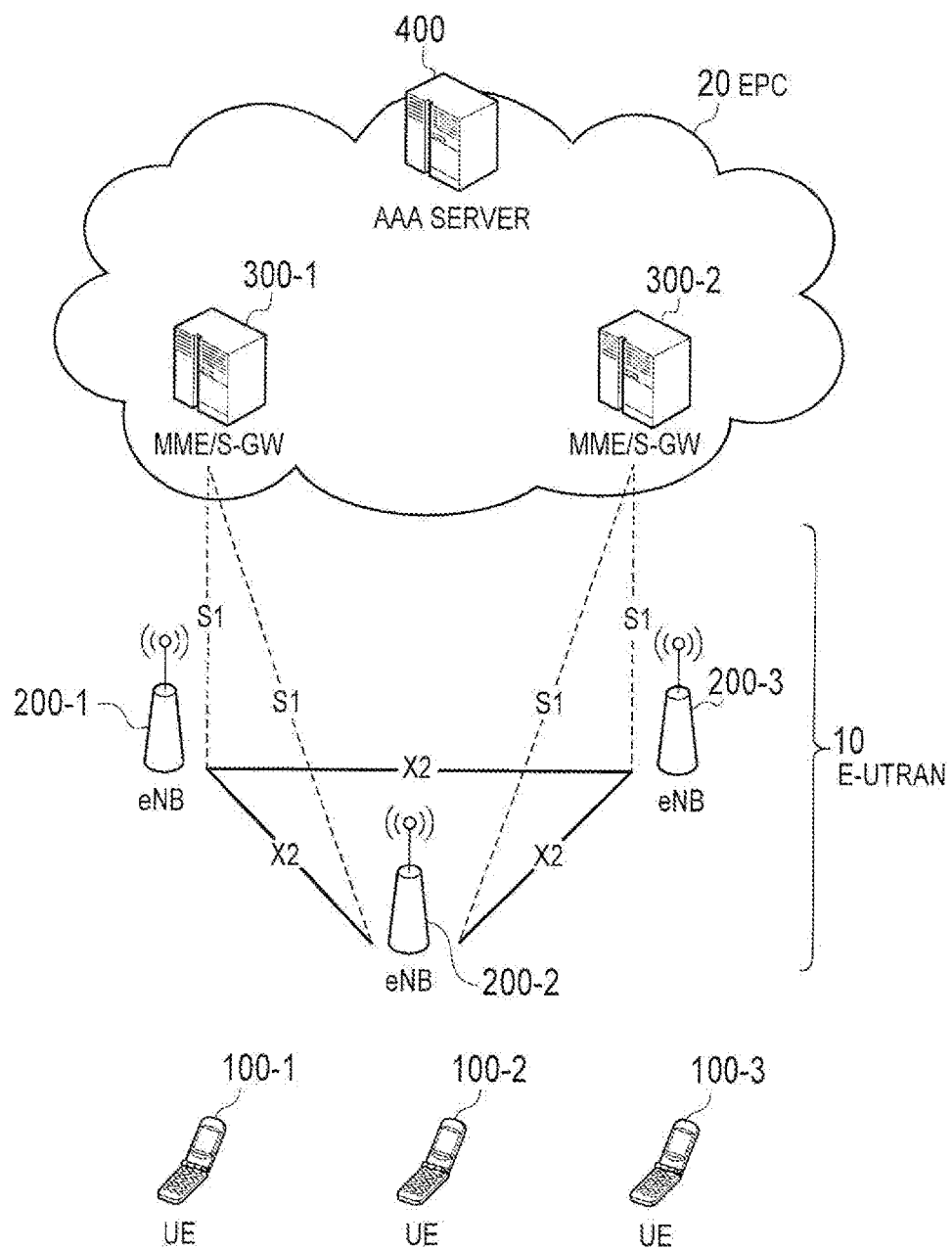
FIG. 1 is a configuration diagram of an LTE system.

A mobile communication system according to a first embodiment to a fourth embodiment includes a base station, and a first user terminal and a second user terminal that establish a connection with the base station. When the first user terminal starts D2D communication, which is direct device to device communication, with the second user terminal, the first user terminal notifies the base station of the amount of specific data transmitted preferably in the D2D communication. In this way, since the base station is able to recognize the amount of the specific data transmitted preferably in the D2D communication, it is possible to appropriately perform D2D communication control (assignment of a radio resource to the D2D communication and the like).

In the first embodiment and the third embodiment, when the first user terminal notifies the base station of a desire for performing the D2D communication, the first user terminal notifies the base station of the amount of the specific data. In this way, since it is possible to control the amount of the specific data to be included into the notification indicating the desire for performing the D2D communication, it is possible to suppress an increase in signaling.

When the first user terminal notifies the base station of the desire for performing the D2D communication, the first user terminal may notify the base station of required transmission power in the D2D communication. In this way, the base station is able to determine whether to permit the D2D communication in consideration of the required transmission power in the D2D communication.

In the second embodiment and the fourth embodiment, after the first user terminal is notified of the permission of the D2D communication from the base station, the first user terminal notifies the base station of the amount of the specific data. In this way, it is possible to notify the base station of the amount of specific data when it has been fixed to start the D2D communication.

The first user terminal may notify the base station of the amount of data, which is addressed to the second user terminal and corresponds to a predetermined application, as the amount of the specific data. In this way, it is possible to appropriately transmit the data, which corresponds to the predetermined application, in the D2D communication.

Alternatively, the first user terminal may notify the base station of the amount of data, which is addressed to the second user terminal and requires predetermined service quality, as the amount of the specific data. In this way, it is possible to appropriately transmit the data, which requires the predetermined service quality, in the D2D communication.

In the first embodiment and the second embodiment, when the second user terminal starts the D2D communication, the second user terminal notifies the base station of the amount of specific data transmitted preferably in the D2D communication. In this way, since the base station is able to recognize the amount of specific data corresponding to the second user terminal as well as the amount of specific data corresponding to the first user terminal, it is possible to appropriately perform D2D communication control (assignment of a radio resource to the D2D communication and the like).

In the third embodiment and the fourth embodiment, the second user terminal notifies the first user terminal of the amount of specific data transmitted preferably in the D2D communication. The first user terminal notifies the base station of the amount of the specific data corresponding to the first user terminal, and also notifies the base station of the amount of the specific data corresponding to the second user terminal. In this way, the first user terminal is able to notify the base station of the amount of specific data corresponding to oneself, and also notify the base station of the amount of specific data corresponding to the second user terminal. Consequently, it is possible to reduce signaling between the base station and the second user terminal.

At least one of the first user terminal and the second user terminal may include the amount of the specific data corresponding to oneself, into a signal for discovery for discovering a communication partner in the D2D communication, and transmit the signal. In this way, in a step of a discovery process for the D2D communication, it is possible to notify the amount of specific data between terminals.

The base station may determine whether to permit the D2D communication on the basis of at least one of the amount of the specific data corresponding to each of the first user terminal and the second user terminal, a radio state report notified from at least one of the first user terminal and the second user terminal, and required transmission power in the D2D communication. In this way, it is possible to appropriately determine whether to permit the D2D communication.

In the first embodiment to the fourth embodiment, the base station assigns a radio resource to the D2D communication on the basis of the amount of the specific data corresponding to each of the first user terminal and the second user terminal. In this way, it is possible to appropriately assign a radio resource in consideration of the amount of specific data.

In the first embodiment to the fourth embodiment, the base station notifies at least one of the first user terminal and the second user terminal of D2D resource information indicating the radio resource that is assigned to the D2D communication. The D2D resource information may include at least one of a number of a subframe that is assigned to the D2D communication, a time range that is assigned to the D2D communication, and a number of a resource block that is assigned to the D2D communication. In this way, it is possible to appropriately assign a radio resource to the D2D communication.

In the first embodiment to the fourth embodiment, when it is not possible to transmit the amount of the specific data, which corresponds to oneself, in a range of the radio resource that is assigned to the D2D communication, at least one of the first user terminal and the second user terminal notifies the base station of the remaining amount of specific data. In this way, the base station is able to reassign a radio resource for transmitting the remaining specific data.

In the first embodiment to the fourth embodiment, a mobile communication system further includes a server that performs accounting for the D2D communication on the basis of at least one of: the amount of the specific data that is notified to the base station from each of the first user terminal and the second user terminal; and the amount of the radio resource that is assigned to the D2D communication. In this way, it is possible to appropriately perform accounting for the D2D communication.

A user terminal according to the first embodiment to the fourth embodiment establishes a connection with a base station. The user terminal comprises: a control unit that notifies the base station of an amount of specific data transmitted preferably in the D2D communication, when the user terminal starts D2D communication, which is direct device to device communication, with another user terminal.

A processor according to the first embodiment to the fourth embodiment is provided in a user terminal that establishes a connection with a base station. The processor performs: a process of notifying, by the user terminal, the base station of an amount of specific data transmitted preferably in the D2D communication, when the user terminal starts D2D communication, which is direct device to device communication, with another user terminal.

A base station according to the first embodiment to the fourth embodiment establishes a connection with a first user terminal and a second user terminal in a mobile communication system that supports D2D communication that is direct device to device communication. The base station comprises: a control unit that assigns a radio resource to the D2D communication by the first user terminal and the second user terminal on the basis of an amount of specific data corresponding to each of the first user terminal and the second user terminal. The amount of the specific data includes an amount of data transmitted preferably in the D2D communication.

A processor according to the first embodiment to the fourth embodiment is provided in abase station that establishes a connection with a first user terminal and a second user terminal in a mobile communication system that supports D2D communication that is direct device to device communication. The base station performs a process for assigning a radio resource to the D2D communication by the first user terminal and the second user terminal on the basis of the specific data corresponding to each of the first user terminal and the second user terminal. The amount of the specific data includes an amount of data transmitted preferably in the D2D communication.

A communication control method according to the first embodiment to the fourth embodiment is used in a mobile communication system, which includes a base station and a first user terminal and a second user terminal that establish a connection with the base station. The communication control method comprises: a step of notifying, by the first user terminal, the base station of an amount of specific data transmitted preferably in D2D communication that is direct device to device communication, when the first user terminal starts the D2D communication with the second user terminal.

First Embodiment

Hereinafter, with reference to the accompanying drawings, description will be provided for an embodiment in which D2D communication is introduced to a mobile communication system (an LTE system) configured based on the 3GPP standards.

(LTE System)

FIG. 1 is a configuration diagram of the LTE system according to the present embodiment.

As illustrated in FIG. 1, the LTE system includes a plurality of UEs (User Equipments) 100, E-UTRAN (Evolved Universal Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 controls a cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes a MME (Mobility Management Entity)/S-GWs (Serving-Gateways) 300 and an AAA server 400.

The MME is a network node for performing various mobility controls, for example, for the UE 100 and corresponds to a controller. The S-GW is a network node that performs transfer control of user data and corresponds to a mobile switching center.

The eNBs 200 are connected mutually via an X2 interface. Furthermore, the eNB 200 is connected to the MME/S-GW 300 via an S1 interface.

The AAA server 400 is a server device that performs authentication, authorization, and accounting.

Next, the configurations of the UE 100 and the eNB 200 will be described.

Figure 2:
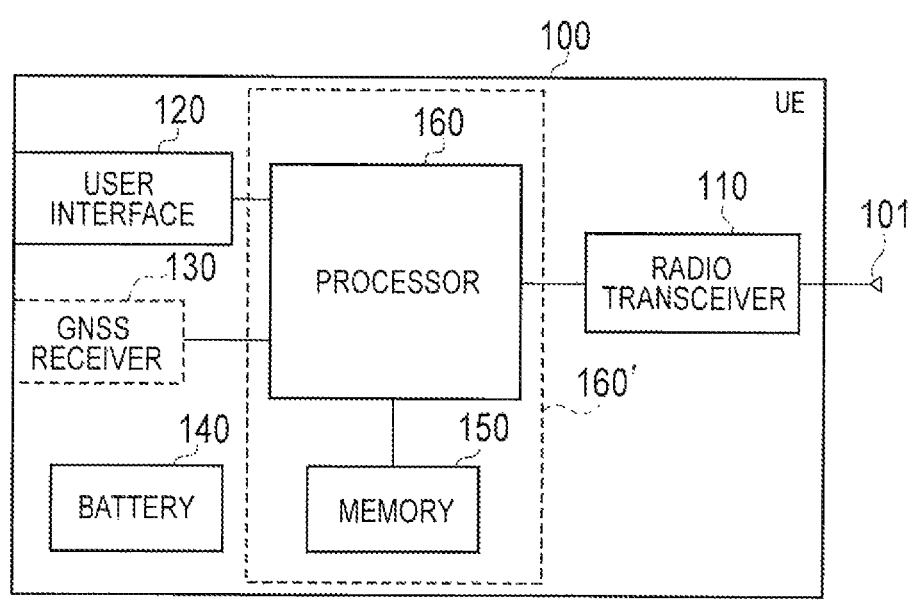
FIG. 2 is a block diagram of UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs coding and decoding of sound and video signals. The processor 160 implements various processes and various communication protocols described later.

Figure 3:
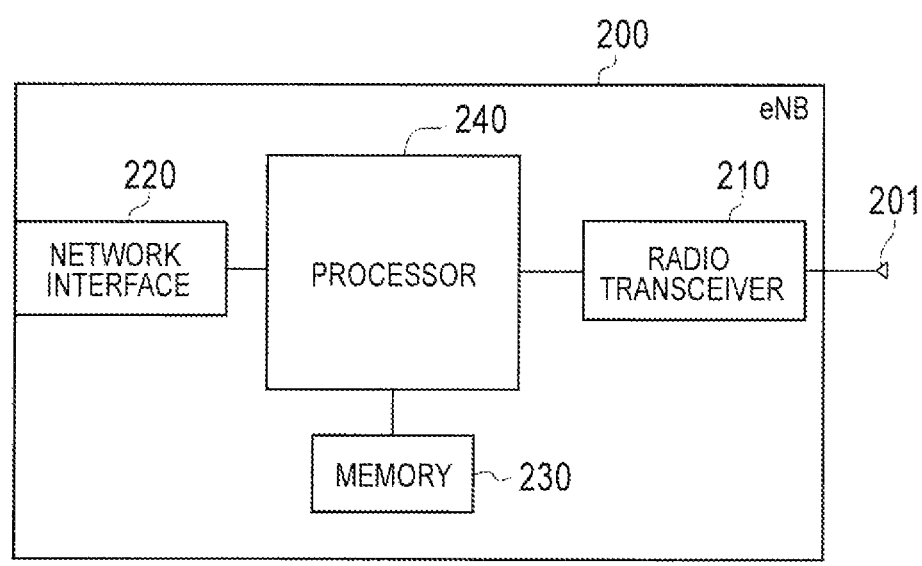
FIG. 3 is a block diagram of eNB.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit. In addition, the memory 230 may be integrally formed with the processor 240, and this set (that is, a chipset) may be called a processor.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, encoding and decoding and the like of the baseband signal and a CPU that performs various processes by executing the program stored in the memory 230. The processor 240 implements various processes and various communication protocols described later.

Figure 4:
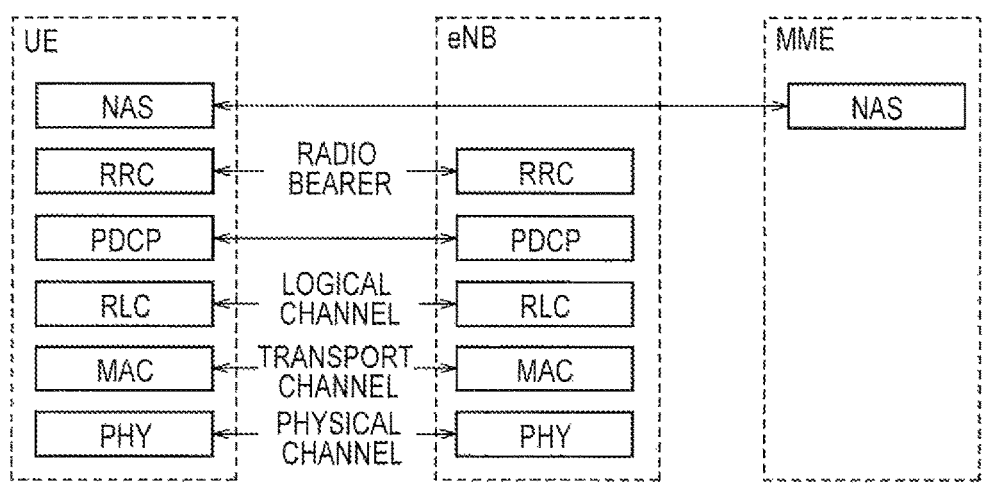
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs preferential control of data, and a retransmission process and the like by hybrid ARQ (an HARQ). Between the MAC layer of the UE 100 and the MAC layer of the eNB 200, data is transmitted via a transport channel. The MAC layer of the eNB 200 includes a scheduler that determines an uplink and downlink transport format (a transport block size, a modulation and coding scheme and the like) and an assignment resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connection state, and when the RRC connection is not established, the UE 100 is in an idle state.

A NAS (Non-Access Stratum) layer positioned above the RRC layer performs session management or mobility management, for example.

Figure 5:
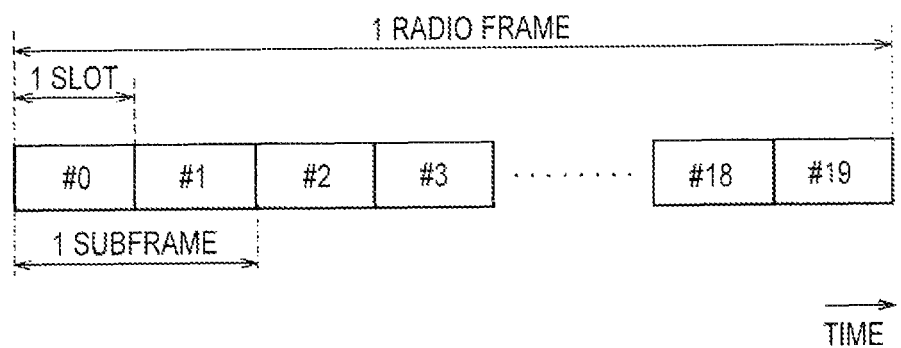
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at ahead thereof with a guard interval called a cyclic prefix (CP). The resource block includes a plurality of subcarriers in the frequency direction.

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the other interval of each subframe is a region mainly used as a physical downlink shared channel (PDSCH). Moreover, in each subframe, cell-specific reference signals (CRSs) are distributed and arranged.

In the uplink, both end portions in the frequency direction of each subframe are control regions mainly used as a physical uplink control channel (PUCCH). Furthermore, the center portion, in the frequency direction, of each subframe is a region mainly used as a physical uplink shared channel (PUSCH).

(D2D Communication)

The LTE system according to the present embodiment supports the D2D communication. Hereinafter, the D2D communication will be described in comparison with normal communication (cellular communication) of the LTE system. In the cellular communication, data communication is performed between the network (the eNB 200) and the UE 100. On the other hand, in the D2D communication, data communication is directly performed among two or more UEs 100.

Figure 6:
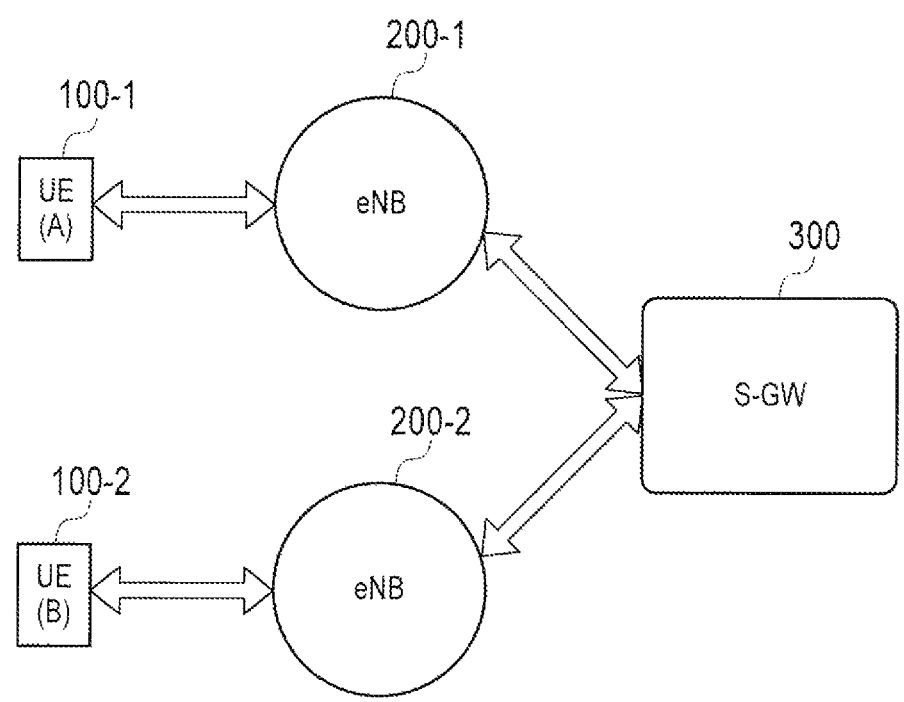
FIG. 6 is a diagram for explaining a data path in cellular communication.

FIG. 6 illustrates a data path in the cellular communication. In this case, FIG. 6 illustrates the case in which the cellular communication is performed between UE 100-1 that establishes a connection with eNB 200-1 and UE 100-2 that establishes a connection with eNB 200-2. It is noted that the data path indicates a transfer path of user data (a user plane).

As illustrated in FIG. 6, the data path of the cellular communication goes through a network (a core network). Specifically, the data path is set to pass through the eNB 200-1, the S-GW 300, and the eNB 200-2.

Figure 7:
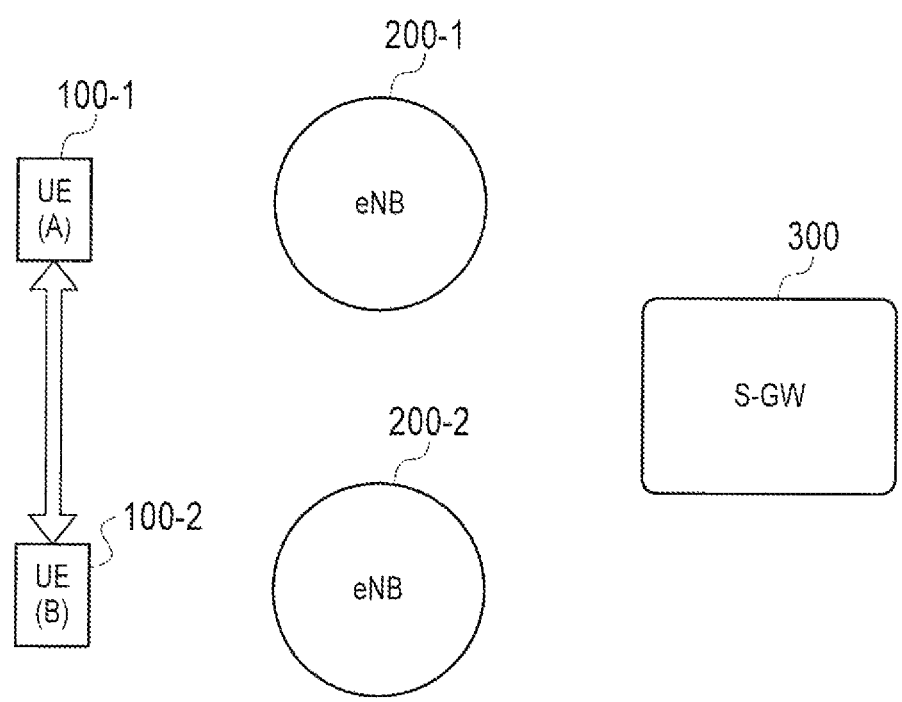
FIG. 7 is a diagram for explaining a data path in D2D communication.

FIG. 7 illustrates a data path in the D2D communication. In this case, FIG. 7 illustrates the case in which the D2D communication is performed between the UE 100-1 that establishes a connection with the eNB 200-1 and the UE 100-2 that establishes a connection with the eNB 200-2.

As illustrated in FIG. 7, the data path of the D2D communication does not pass through the network. That is, direct radio communication is performed between UEs. As described above, when the UE 100-2 exists in the vicinity of the UE 100-1, the D2D communication is performed between the UE 100-1 and the UE 100-2, thereby obtaining an effect such as a traffic load on the network and a battery consumption amount of the UE 100 are reduced.

It is noted that cases in which the D2D communication is started include (a) a case in which the D2D communication is started after a partner terminal is discovered by performing an operation for discovering a partner terminal, and (b) a case in which the D2D communication is started without performing an operation for discovering a partner terminal.

For example, in the above-described case (a), one UE 100 of the UE 100-1 and the UE 100-2 discovers the other UE 100 existing in the proximity of the one UE 100, so that the D2D communication is started.

In such a case, in order to discover the proximal terminal, the UE 100 has a (Discover) function of discovering another UE 100 existing in the proximity of the UE 100, and/or a (Discoverable) function of being discovered by another UE 100.

For example, one UE of the UE 100-1 and the UE 100-2 transmits a signal for discovery (Discover signal) to the vicinity of the one UE, and the other UE receives the signal for discovery, so that the other UE discovers the one UE. Furthermore, the other UE transmits a response signal for the signal for discovery to the vicinity of the other UE and the one UE receives the response signal, so that the one UE discovers the other UE.

It is noted that the UE 100 need not necessarily perform the D2D communication even upon discovering a partner terminal. For example, after mutually discovering each other, the UE 100-1 and the UE 100-2 may perform a negotiation, and determine whether or not to perform the D2D communication. When each of the UE 100-1 and the UE 100-2 agrees to perform the D2D communication, the D2D communication starts.

On the other hand, in the above-described case (b), for example, the UE 100-1 starts broadcasting a signal for the D2D communication. Thus, the UE 100 is capable of starting the D2D communication regardless of the existence of the discovery of a partner terminal.

Note that the D2D communication is considered to be performed in a frequency band (that is, in a frequency band of the cellular communication) of the LTE system, and for example, in order to avoid interference to the cellular communication, the D2D communication is performed under the control of the network (the eNB 200).

(Operation According to First Embodiment)

FIG. 8 is a diagram for explaining an operation environment according to the present embodiment.

As illustrated in FIG. 8, the case, in which, in an operation environment having the eNB 200, and the UE 100-1 and the UE 100-2 that establish a connection with the eNB 200, the UE 100-1 and the UE 100-2 start D2D communication, is considered.

When starting the D2D communication with the UE 100-2, the UE 100-1 notifies the eNB 200 of the amount of specific data transmitted preferably in the D2D communication.

Furthermore, when starting the D2D communication with the UE 100-1, the UE 100-2 notifies the eNB 200 of the amount of specific data transmitted preferably in the D2D communication.

Furthermore, the specific data is data that is addressed to a communication partner in the D2D communication and corresponds to a predetermined application. The predetermined application is an application commensurate with the D2D communication, and for example, indicates an application requiring low delay or an application requiring large data capacity.

Alternatively, the specific data may be data that is addressed to a communication partner in the D2D communication and data requiring predetermined service quality (QoS; Quality of Service). The predetermined service quality (QoS) is high service quality, and for example, indicates data that is transmitted through a bearer in which QCI (QoS Class Identifier) is equal to or more than a predetermined value. In addition, the QCI is an index indicating priority determined in response to the presence or absence of transmission rate guarantee, a delay permission time, an acceptable packet loss rate and the like.

In the present embodiment, when the UE 100-1 notifies the eNB 200 of a desire for performing the D2D communication, the UE 100-1 notifies the eNB 200 of the amount of specific data corresponding to oneself. In the same manner, when the UE 100-2 notifies the eNB 200 of a desire for performing the D2D communication, the UE 100-2 notifies the eNB 200 of the amount of specific data corresponding to oneself.

On the basis of the amount of the specific data corresponding to each of the UE 100-1 and the UE 100-2 and the radio state report notified from at least one of the UE 100-1 and the UE 100-2, the eNB 200 determines whether to permit the D2D communication. The radio state report is a report (Measurement report) including information indicating a measurement result of a reception state of a reference signal received in the UE 100 from the eNB 200. Such a measurement result, for example, indicates reference signal received power (RSRP) and reference signal received quality (RSRQ).

When it has been determined to permit the D2D communication, the eNB 200 assigns a radio resource to the D2D communication on the basis of the amount of the specific data corresponding to each of the UE 100-1 and the UE 100-2. Then, the eNB 200 notifies at least one of the UE 100-1 and the UE 100-2 of D2D resource information indicating the radio resource that is assigned to the D2D communication.

For example, the D2D resource information includes at least one of a number of a subframe that is assigned to the D2D communication, a time range that is assigned to the D2D communication, and a number of a resource block that is assigned to the D2D communication. The time range, which is assigned to the D2D communication, for example, indicates a combination of a start subframe number and an end subframe number, or a timer value (a value indicating a period).

Alternatively, the D2D resource information may include information indicating a number of a resource block to be used after a predetermined subframe from the notification of the D2D resource information, similarly to assignment resource information of the cellular communication. In this case, the UE 100 which has received the D2D resource information uses a resource block indicated by the D2D resource information for the D2D communication after the predetermined subframe from the notification of the D2D resource information.

Then, the UE 100-1 and the UE 100-2 perform the D2D communication by using the radio resource that is assigned to the D2D communication by the eNB 200.

Thereafter, when it is not possible to transmit the amount of the specific data, which corresponds to oneself, in a range of the radio resource that is assigned to the D2D communication, at least one of the UE 100-1 and the UE 100-2 notifies the eNB 200 of the amount of remaining specific data. In this case, the eNB 200 is able to reassign a radio resource for transmitting the remaining specific data.

Furthermore, the AAA server 400 performs accounting for the D2D communication on the basis of at least one of: the amount of the specific data, which is notified from each of the UE 100-1 and the UE 100-2 to the eNB; and the amount of the radio resource that is assigned to the D2D communication.

Figure 9:
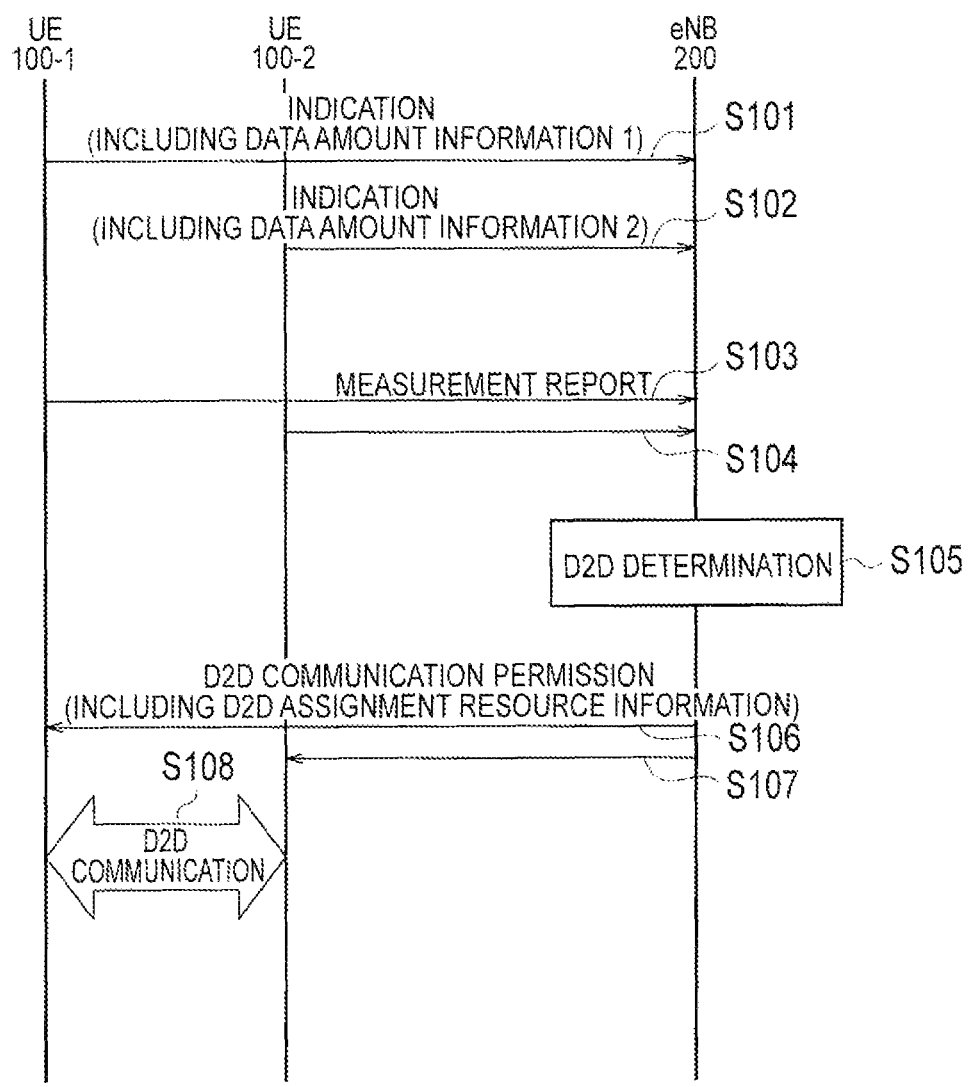
FIG. 9 is an operation sequence diagram according to the first embodiment.

Next, a detailed example of an operation sequence according to the present embodiment will be described. FIG. 9 is an operation sequence diagram according to the present embodiment. The present sequence indicates an operation after the UE 100-1 and the UE 100-2 determined to start the D2D communication through the aforementioned discovery process.

As illustrated in FIG. 9, in step S101, the UE 100-1 transmits a notification (Indication) indicating a desire for performing the D2D communication to the eNB 200. Furthermore, the UE 100-1 includes data amount information 1 indicating the amount of specific data transmitted preferably in the D2D communication, into the notification, and transmits the notification. When the notification (Indication) is received from the UE 100-1, the eNB 200 recognizes the amount of specific data corresponding to the UE 100-1 from the data amount information 1 included in the notification.

In step S102, the UE 100-2 transmits a notification (Indication) indicating a desire for performing the D2D communication to the eNB 200. Furthermore, the UE 100-2 includes data amount information 2 indicating the amount of specific data transmitted preferably in the D2D communication, into the notification, and transmits the notification. When the notification (Indication) is received from the UE 100-2, the eNB 200 recognizes the amount of specific data corresponding to the UE 100-2 from the data amount information 2 included in the notification.

In step S103, the UE 100-1 transmits a reception state report (Measurement report) to the eNB 200 on the basis of a reference signal that is received from the eNB 200. When the reception state report is received from the UE 100-1, the eNB 200 recognizes a radio state corresponding to the UE 100-1.

In step S104, the UE 100-2 transmits a reception state report (Measurement report) to the eNB 200 on the basis of the reference signal that is received from the eNB 200. When the reception state report is received from the UE 100-2, the eNB 200 recognizes a radio state corresponding to the UE 100-2.

In step S105, the eNB 200 determines whether to permit the D2D communication by the UE 100-1 and the UE 100-2 on the basis of the amount of the specific data corresponding to each of the UE 100-1 and the UE 100-2, and the radio states corresponding to each of the UE 100-1 and the UE 100-2. For example, when received power of the reference signal received in each of the UE 100-1 and the UE 100-2 from the eNB 200 is high, the eNB 200 may reject the D2D communication in order to avoid interference from the D2D communication by the UE 100-1 and the UE 100-2. Furthermore, when the amount of the specific data corresponding to each of the UE 100-1 and the UE 100-2 is small, the eNB 200 may regard that the necessity of starting the D2D communication is low and reject the D2D communication. Hereinafter, a description will be given on the assumption that the eNB 200 has permitted the D2D communication.

Moreover, on the basis of the amount of the specific data corresponding to each of the UE 100-1 and the UE 100-2, the eNB 200 determines a radio resource that is assigned to the D2D communication by the UE 100-1 and the UE 100-2. For example, as the amount of the specific data corresponding to each of the UE 100-1 and the UE 100-2 is large, the eNB 200 increases the amount of the radio resource that is assigned to the D2D communication.

In step S106, the eNB 200 transmits, to the UE 100-1, a notification (D2D communication permission) indicating that the D2D communication is permitted. Furthermore, the eNB 200 includes D2D assignment resource information, which indicates the radio resource to be assigned to the D2D communication by the UE 100-1 and the UE 100-2, into the notification (the D2D communication permission), and transmits the notification. When the D2D communication permission is received, the UE 100-1 recognizes the radio resource assigned to the D2D communication from the D2D assignment resource information included in the D2D communication permission.

In step S107, the eNB 200 transmits, to the UE 100-2, a notification (D2D communication permission) indicating that the D2D communication is permitted. Furthermore, the eNB 200 includes D2D assignment resource information, which indicates the radio resource to be assigned to the D2D communication by the UE 100-1 and the UE 100-2, into the notification (the D2D communication permission), and transmits the notification. When the D2D communication permission is received, the UE 100-2 recognizes the radio resource assigned to the D2D communication from the D2D assignment resource information included in the D2D communication permission.

In step S108, the UE 100-1 and the UE 100-2 perform the D2D communication by using the radio resource assigned from the eNB 200.

Then, when it is not possible to transmit the amount of the specific data, which corresponds to oneself and the UE 100-2, in a range of the radio resource that is assigned to the D2D communication, the UE 100-1 and the UE 100-2 notify the eNB 200 of the remaining amount of specific data. In this case, the UE 100-1 and the UE 100-2 may notify the eNB 200 of the amount of data transmitted using a radio resource (a D2D assignment period of a previous time) assigned in a previous time.

Furthermore, the AAA server 400 performs accounting for the D2D communication on the basis of at least one of: the amount of the specific data, which is notified from each of the UE 100-1 and the UE 100-2 to the eNB; and the amount of the radio resource that is assigned to the D2D communication. Moreover, the AAA server 400 may use the amount of the data, which was transmitted using the radio resource (the D2D assignment period of the previous time) assigned in the previous time and is notified from each of the UE 100-1 and the UE 100-2 to the eNB 200, for the accounting.

Second Embodiment

Hereinafter, the second embodiment will be described while focusing on the differences from the first embodiment. A communication environment according to the second embodiment is the same as that of the first embodiment.

In the aforementioned first embodiment, when notifying the eNB 200 of the desire for performing the D2D communication, each of the UE 100-1 and the UE 100-2 notifies the eNB 200 of the amount of the specific data corresponding to oneself. On the other hand, in the second embodiment, after the permission of the D2D communication is notified from the eNB 200, each of the UE 100-1 and the UE 100-2 notifies the eNB 200 of the amount of specific data.

Figure 10:
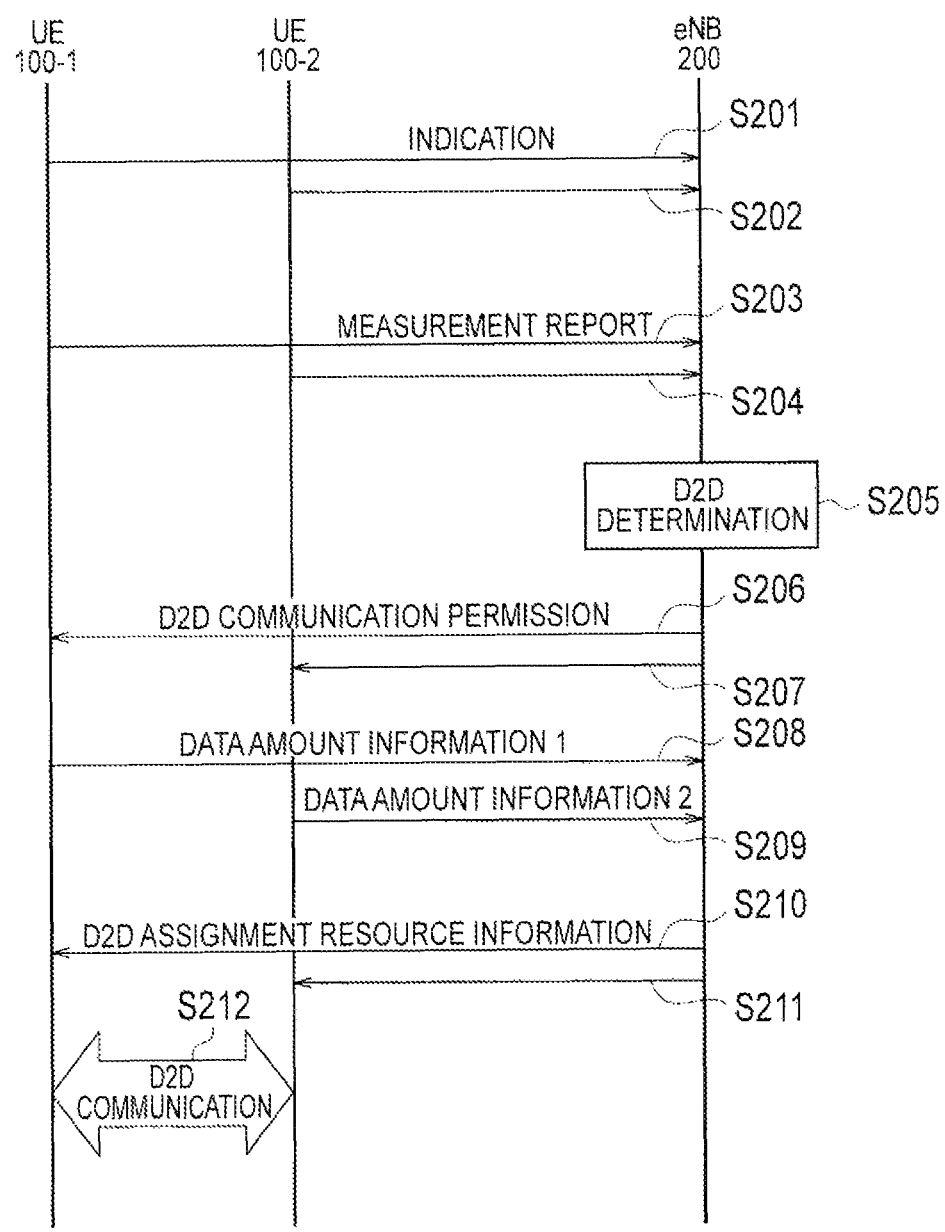
FIG. 10 is an operation sequence diagram according to the second embodiment.

Next, a detailed example of an operation sequence according to the present embodiment will be described. FIG. 10 is an operation sequence diagram according to the present embodiment.

As illustrated in FIG. 10, in step S201, the UE 100-1 transmits a notification (Indication) indicating a desire for performing the D2D communication to the eNB 200.

In step S202, the UE 100-2 transmits a notification (Indication) indicating a desire for performing the D2D communication to the eNB 200.

In step S203, the UE 100-1 transmits a reception state report (Measurement report) to the eNB 200 on the basis of a reference signal that is received from the eNB 200. When the reception state report is received from the UE 100-1, the eNB 200 recognizes a radio state corresponding to the UE 100-1.

In step S204, the UE 100-2 transmits a reception state report (Measurement report) to the eNB 200 on the basis of the reference signal that is received from the eNB 200. When the reception state report is received from the UE 100-2, the eNB 200 recognizes a radio state corresponding to the UE 100-2.

In step S205, the eNB 200 determines whether to permit the D2D communication by the UE 100-1 and the UE 100-2 on the basis of the radio states corresponding to each of the UE 100-1 and the UE 100-2. For example, when received power of the reference signal received in each of the UE 100-1 and the UE 100-2 from the eNB 200 is high, the eNB 200 may reject the D2D communication in order to avoid interference from the D2D communication by the UE 100-1 and the UE 100-2. Hereinafter, a description will be given on the assumption that the eNB 200 has permitted the D2D communication.

In step S206, the eNB 200 transmits, to the UE 100-1, a notification (D2D communication permission) indicating that the D2D communication is permitted.

In step S207, the eNB 200 transmits, to the UE 100-2, a notification (D2D communication permission) indicating that the D2D communication is permitted.

In step S208, the UE 100-1 transmits, to the eNB 200, the data amount information 1 indicating the amount of specific data transmitted preferably in the D2D communication, in response to the reception of the notification (D2D communication permission) in step S206. When the data amount information 1 is received, the eNB 200 recognizes the amount of the specific data corresponding to the UE 100-1.

In step S209, the UE 100-2 transmits, to the eNB 200, the data amount information 2 indicating the amount of specific data transmitted preferably in the D2D communication, in response to the reception of the notification (D2D communication permission) in step S207. When the data amount information 2 is received, the eNB 200 recognizes the amount of the specific data corresponding to the UE 100-2.

On the basis of the amount of the specific data corresponding to each of the UE 100-1 and the UE 100-2, the eNB 200 determines a radio resource that is assigned to the D2D communication by the UE 100-1 and the UE 100-2. For example, as the amount of the specific data corresponding to each of the UE 100-1 and the UE 100-2 is large, the eNB 200 increases the amount of the radio resource that is assigned to the D2D communication.

In step S210, the eNB 200 transmits, to the UE 100-1, D2D assignment resource information indicating the radio resource that is assigned to the D2D communication by the UE 100-1 and the UE 100-2. When the D2D assignment resource information is received, the UE 100-1 recognizes the radio resource assigned to the D2D communication.

In step S211, the eNB 200 transmits, to the UE 100-2, the D2D assignment resource information indicating the radio resource that is assigned to the D2D communication by the UE 100-1 and the UE 100-2. When the D2D assignment resource information is received, the UE 100-2 recognizes the radio resource assigned to the D2D communication.

In step S212, the UE 100-1 and the UE 100-2 perform the D2D communication by using the radio resource assigned from the eNB 200. The subsequent operation is the same as that of the first embodiment.

Third Embodiment

Hereinafter, the third embodiment will be described while focusing on the differences from the first and the second embodiments. A communication environment according to the third embodiment is the same as that of the first embodiment.

In the aforementioned first embodiment, each of the UE 100-1 and the UE 100-2 notifies the eNB 200 of the amount of the specific data corresponding to oneself. On the other hand, in the third embodiment, the UE 100-2 notifies the UE 100-1 of the amount of specific data transmitted preferably in the D2D communication. The UE 100-1 notifies the eNB 200 of the amount of specific data corresponding to the UE 100-1 and also notifies the eNB 200 of the amount of specific data corresponding to the UE 100-2.

As described above, in the third embodiment, the UE 100-1 performs communication (specifically, communication of a control plane) with the eNB 200 as a representative of a UE group (the UE 100-1 and the UE 100-2), which is an object of the D2D communication, and performs control of the D2D communication. Such UE 100-1 may be called "anchor UE".

Figure 11:
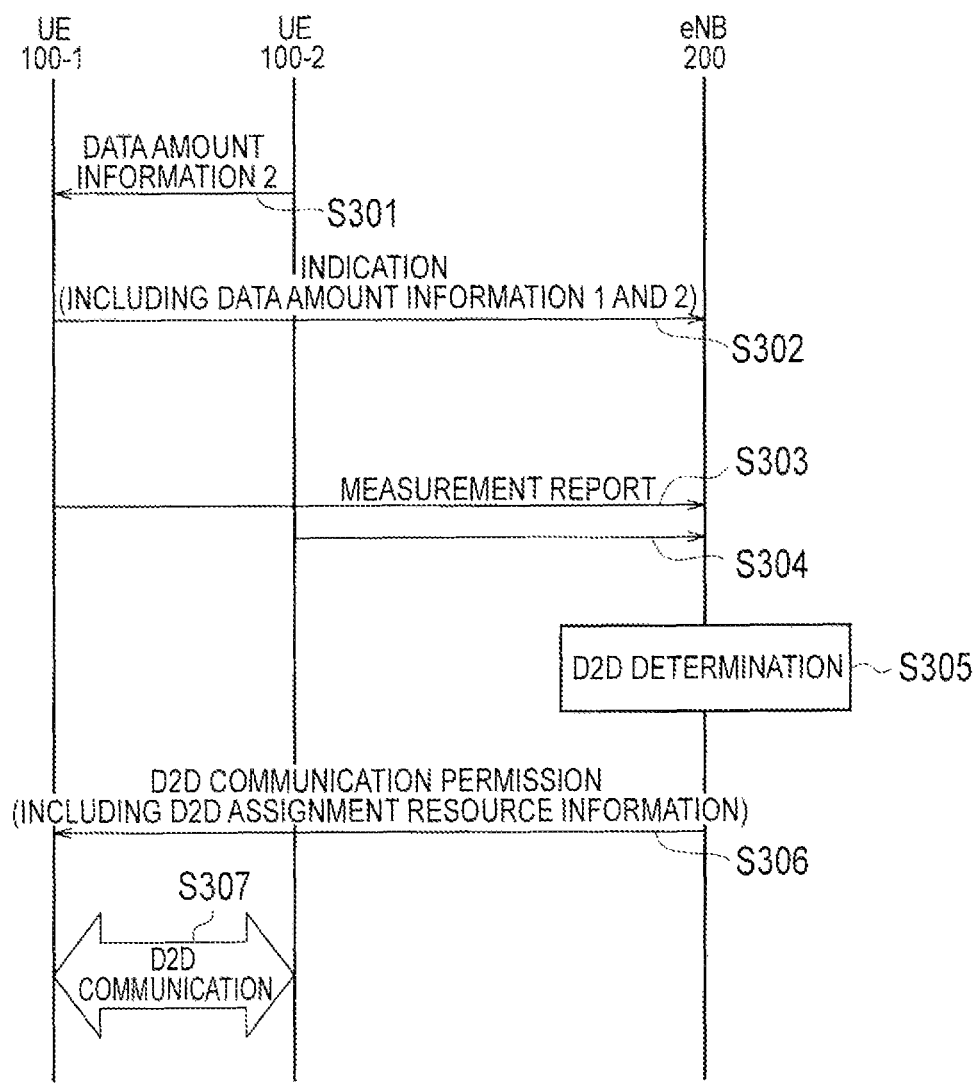
FIG. 11 is an operation sequence diagram according to the third embodiment.

Next, a detailed example of an operation sequence according to the present embodiment will be described. FIG. 11 is an operation sequence diagram according to the present embodiment.

As illustrated in FIG. 11, in step S301, the UE 100-2 notifies the UE 100-1 of the data amount information 2 indicating the amount of specific data transmitted preferably in the D2D communication. Furthermore, the UE 100-2 may control the data amount information 2 to be included into a signal for discovery for discovering a communication partner in the D2D communication, and notify the UE 100-1 of the data amount information 2.

In step S302, the UE 100-1 transmits a notification (Indication) indicating a desire for performing the D2D communication to the eNB 200. Furthermore, the UE 100-1 includes the data amount information 1 indicating the amount of specific data transmitted preferably in the D2D communication, into the notification (Indication), and transmits the notification. Moreover, the UE 100-1 includes the data amount information 2 notified from the UE 100-2, into the notification (Indication), and transmits the notification. When the notification (Indication) is received from the UE 100-1, the eNB 200 recognizes the amount of specific data corresponding to each of the UE 100-1 and the UE 100-2 from the data amount information 1 and 2 included in the notification.

In step S303, the UE 100-1 transmits a reception state report (Measurement report) to the eNB 200 on the basis of a reference signal that is received from the eNB 200. When the reception state report is received from the UE 100-1, the eNB 200 recognizes a radio state corresponding to the UE 100-1.

In step S304, the UE 100-2 transmits a reception state report (Measurement report) to the eNB 200 on the basis of the reference signal that is received from the eNB 200. When the reception state report is received from the UE 100-2, the eNB 200 recognizes a radio state corresponding to the UE 100-2.

In step S305, the eNB 200 determines whether to permit the D2D communication by the UE 100-1 and the UE 100-2 on the basis of the amount of the specific data corresponding to each of the UE 100-1 and the UE 100-2, and the radio states corresponding to each of the UE 100-1 and the UE 100-2. Hereinafter, a description will be given on the assumption that the eNB 200 has permitted the D2D communication.

Moreover, on the basis of the amount of the specific data corresponding to each of the UE 100-1 and the UE 100-2, the eNB 200 determines a radio resource that is assigned to the D2D communication by the UE 100-1 and the UE 100-2.

In step S306, the eNB 200 transmits, to the UE 100-1, a notification (D2D communication permission) indicating that the D2D communication is permitted. Furthermore, the eNB 200 includes D2D assignment resource information, which indicates the radio resource to be assigned to the D2D communication by the UE 100-1 and the UE 100-2, into the notification (the D2D communication permission), and transmits the notification. When the D2D communication permission is received, the UE 100-1 recognizes the radio resource assigned to the D2D communication from the D2D assignment resource information included in the D2D communication permission.

In step S307, the UE 100-1 and the UE 100-2 perform the D2D communication by using the radio resource assigned from the eNB 200.

The subsequent operation is the same as that of the first embodiment, but is different from the first embodiment in the following point. When it is not possible to transmit the amount of the specific data, which corresponds to the UE 100-2, in a range of the radio resource that is assigned to the D2D communication, the UE 100-2 notifies the UE 100-1 of the remaining amount of specific data. In this case, the UE 100-2 may notify the UE 100-1 of the amount of data transmitted using a radio resource assigned in a previous time. The UE 100-1 notifies the eNB 200 of the remaining amount (and the amount of the data transmitted using the radio resource assigned in the previous time) of the specific data notified from the UE 100-2.

Fourth Embodiment

Hereinafter, the fourth embodiment will be described while focusing on the differences from the first embodiment to the third embodiment. A communication environment according to the fourth embodiment is the same as that according to the first embodiment. Furthermore, the fourth embodiment is the same as the third embodiment in that anchor UE exists.

In the aforementioned third embodiment, when notifying the eNB 200 of the desire for performing the D2D communication, the UE 100-1 notifies the eNB 200 of the amount of specific data. On the other hand, in the fourth embodiment, after the permission of the D2D communication is notified from the eNB 200, the UE 100-1 notifies the eNB 200 of the amount of specific data.

Figure 12:
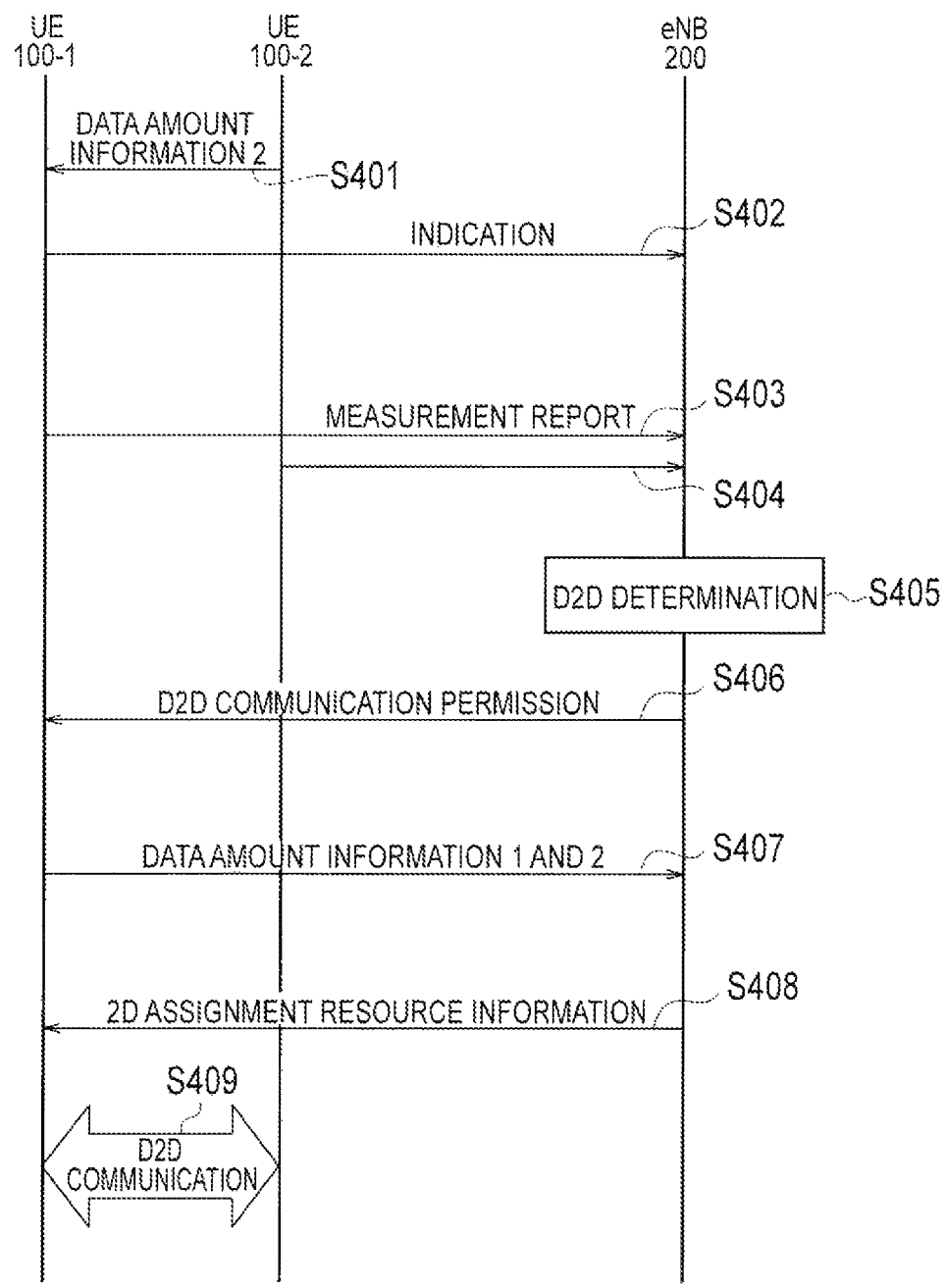
FIG. 12 is an operation sequence diagram according to the fourth embodiment.

Next, a detailed example of an operation sequence according to the present embodiment will be described. FIG. 12 is an operation sequence diagram according to the present embodiment.

As illustrated in FIG. 12, in step S401, the UE 100-2 notifies the UE 100-1 of the data amount information 2 indicating the amount of specific data transmitted preferably in the D2D communication. Furthermore, the UE 100-2 may control the data amount information 2 to be included into a signal for discovery for discovering a communication partner in the D2D communication, and notify the UE 100-1 of the data amount information 2.

In step S402, the UE 100-1 transmits a notification (Indication) indicating a desire for performing the D2D communication to the eNB 200.

In step S403, the UE 100-1 transmits a reception state report (Measurement report) to the eNB 200 on the basis of a reference signal that is received from the eNB 200. When the reception state report is received from the UE 100-1, the eNB 200 recognizes a radio state corresponding to the UE 100-1.

In step S404, the UE 100-2 transmits a reception state report (Measurement report) to the eNB 200 on the basis of the reference signal that is received from the eNB 200. When the reception state report is received from the UE 100-2, the eNB 200 recognizes a radio state corresponding to the UE 100-2.

In step S405, the eNB 200 determines whether to permit the D2D communication by the UE 100-1 and the UE 100-2 on the basis of the radio states corresponding to each of the UE 100-1 and the UE 100-2. Hereinafter, a description will be given on the assumption that the eNB 200 has permitted the D2D communication.

In step S406, the eNB 200 transmits, to the UE 100-1, a notification (D2D communication permission) indicating that the D2D communication is permitted.

In step S407, the UE 100-1 transmits, to the eNB 200, the data amount information 1 indicating the amount of specific data transmitted preferably in the D2D communication, and the data amount information 2 notified from the UE 100-2. When the data amount information 1 and 2 are received, the eNB 200 recognizes the amount of the specific data corresponding to each of the UE 100-1 and the UE 100-2.

On the basis of the amount of the specific data corresponding to each of the UE 100-1 and the UE 100-2, the eNB 200 determines a radio resource that is assigned to the D2D communication by the UE 100-1 and the UE 100-2.

In step S408, the eNB 200 transmits, to the UE 100-1, D2D assignment resource information indicating the radio resource that is assigned to the D2D communication by the UE 100-1 and the UE 100-2. When the D2D assignment resource information is received, the UE 100-1 recognizes the radio resource assigned to the D2D communication.

In step S409, the UE 100-1 and the UE 100-2 perform the D2D communication by using the radio resource assigned from the eNB 200. The subsequent operation is the same as that of the third embodiment.

In addition, the present embodiment has described an example in which the UE 100-2 controls the data amount information 2 to be included into the signal for discovery, thereby notifying the UE 100-1 of the data amount information 2. However, the data amount information 2 may be acquired from the UE 100-2 after the UE 100-1 receives the D2D communication permission from the eNB 200.

Other Embodiments

Thus, the present disclosure has been described with the first embodiment to the fourth embodiment. However, it should not be understood that those descriptions and drawings constituting a part of this disclosure limit the present disclosure. From this disclosure, a variety of alternate embodiments, examples, and applicable techniques will become apparent to one skilled in the art.

The aforementioned first embodiment to fourth embodiment do not particularly consider transmission power according to the D2D communication. However, in the case of considering the transmission power according to the D2D communication, the following operations may also be applied in addition to the aforementioned operations (or instead of the aforementioned operations).

Firstly, in the aforementioned discovery process, the UE 100-1 (and the UE 100-2) determines transmission power (hereinafter, "required transmission power of D2D communication") required for performing the D2D communication with a communication partner UE on the basis of received power of a signal for discovery, received power of a response signal for the signal for discovery, and the like.

Secondly, when transmitting a notification (Indication) indicating a desire for performing the D2D communication, the UE 100-1 (and the UE 100-2) also notifies the required transmission power of the D2D communication. For example, the UE 100-1 (and the UE 100-2) controls information on the required transmission power of the D2D communication to be included into the notification (Indication).

Thirdly, when determining whether to permit the D2D communication, the eNB 200 also considers the required transmission power of the D2D communication in order to avoid interference to cellular communication from the D2D communication. For example, when the required transmission power of the D2D communication is higher than transmission power of the UE 100-1 (and the UE 100-2) in the cellular communication, which is estimated in the eNB 200, the eNB 200 may reject the D2D communication.

Fourthly, when notifying the eNB 200 of the remaining amount of specific data, which may not be transmitted in a range of an assignment radio resource (that is, when requesting reassignment of a radio resource for the D2D communication), the UE 100-1 (and the UE 100-2) also notifies current transmission power of the D2D communication. For example, the UE 100-1 (and the UE 100-2) controls information on the current transmission power of the D2D communication to be included into the notification or the request.

Fifthly, on the basis of the current transmission power of the D2D communication, the eNB 200 determines whether to permit the continuance of the D2D communication. For example, when the current transmission power of the D2D communication is higher than the transmission power of the UE 100-1 (and the UE 100-2) in the cellular communication, which is estimated in the eNB 200, the eNB 200 may reject the continuance of the D2D communication.

The aforementioned third embodiment and fourth embodiment have described an example in which the UE 100-2 controls the data amount information 2 to be included into the signal for discovery, thereby notifying the UE 100-1 of the data amount information 2. However, the UE 100-1 may control the data amount information 1 to be included into the signal for discovery, thereby notifying the UE 100-2 of the data amount information 1. Furthermore, not only in the third embodiment and the fourth embodiment, but also in the first embodiment and the second embodiment, the data amount information may be included into the signal for discovery.

In the aforementioned first embodiment to fourth embodiment, the eNB 200 determines the radio resource that is assigned to the D2D communication by the UE 100-1 and the UE 100-2 on the basis of the amount of the specific data corresponding to each of the UE 100-1 and the UE 100-2. However, the eNB 200 may determine the radio resource that is assigned to the D2D communication by the UE 100-1 and the UE 100-2 on the basis of the radio states corresponding to each of the UE 100-1 and the UE 100-2 and the amount of the specific data corresponding to each of the UE 100-1 and the UE 100-2. For example, when the received power of the reference signal received in each of the UE 100-1 and the UE 100-2 from the eNB 200 is low, the eNB 200 may determine that it is possible to increase the amount of the radio resource that is assigned to the D2D communication.

In the aforementioned first embodiment to fourth embodiment, the eNB 200 controls the D2D communication; however, this configuration is not restrictive. For example, an upper network node (such as the MME) constituting the core network controls the D2D communication according to the present embodiments instead of the eNB 200. Thus, the network node may receive information (such as the data amount information) from the UE 100 via the eNB 200 and transmit information (such as the notification indicating that the D2D communication is permitted) to the UE 100 via the eNB 200. As described above, a network device such as the eNB 200 and the MME performs the control relevant to the D2D communication.

It is noted that, in the embodiments, a direct communication mode in which the data pass does not pass through the eNB 200 is. However, a local relay mode in which the data pass passes through the eNB 200 may be. It is noted that the local relay mode is called a Locally Routed (L. R) mode. An effect such as the reduction of a traffic load of the EPC 20 and a battery consumption amount of the UE 100 is obtained in the local relay mode.

In addition, the aforementioned embodiments have described an example in which the present disclosure is applied to the LTE system. However, the present disclosure is not limited to the LTE system, and the present disclosure may also be applied to systems, other than the LTE system, as well as the LTE system.

INDUSTRIAL APPLICABILITY

As described above, the present disclosure according to the mobile communication system, the user terminal, the base station, the processor and the communication control method are possible to appropriately control the D2D communication, and thus they are useful in a mobile communication field.

The invention claimed is:
1. A base station comprising:
a control unit, comprising a processor and a memory, configured to:
receive a notification from a first user terminal before starting D2D communication that is direct device to device communication, the notification indicating a desire for performing the D2D communication,
receive a measurement report from the first user terminal, the measurement report including results of measurement of a cell reference signal,
based on the measurement report, determine to cause the first user terminal to perform the D2D communication, perform a process for starting the D2D communication performed between the first user terminal and a second user terminal, receive a first data amount notification transmitted from the first user terminal, wherein the first data amount notification indicates an amount of first data to be transmitted from the first user terminal to the second user terminal, and based on the first data amount notification, allocate first radio resources to the first user terminal, wherein the first radio resources allocated to the first user terminal are used by the first user terminal to transmit the first data.

2. The base station according to claim 1, the control unit is further configured to receive a second data amount notification transmitted from the first user terminal, wherein the second data amount notification indicates an amount of remaining first data to be transmitted from the first user terminal to the second user terminal, and based on the second data amount notification, allocate second radio resources to the first user terminal, wherein the second radio resources allocated to the first user terminal are used by the first user terminal to transmit the remaining first data.

3. A method performed at a base station, comprising:

receiving a notification from a first user terminal before starting D2D communication that is direct device to device communication, the notification indicating a desire for performing the D2D communication;

receiving a measurement report from the first user terminal, the measurement report including results of measurement of a cell reference signal;

based on the measurement report, determining to cause the first user terminal to perform the D2D communication;

performing a process for starting the D2D communication performed between the first user terminal and a second user terminal;

receiving a first data amount notification transmitted from the first user terminal, wherein the first data amount notification indicates an amount of first data to be transmitted from the first user terminal to the second user terminal; and based on the first data amount notification, allocating first radio resources to the first user terminal, wherein the first radio resources allocated to the first user terminal are used by the first user terminal to transmit the first data.

4. The method according to claim 3, further comprising:

receiving a second data amount notification transmitted from the first user terminal, wherein the second data amount notification indicates an amount of remaining first data to be transmitted from the first user terminal to the second user terminal, and based on the second data amount notification, allocating second radio resources to the first user terminal, wherein the second radio resources allocated to the first user terminal are used by the first user terminal to transmit the remaining first data.

5. A device comprising at least one processor and at least one memory, the at least one processor configured to cause a base station to:

receive a notification from a first user terminal before starting D2D communication that is direct device to device communication, the notification indicating a desire for performing the D2D communication, receive a measurement report from the first user terminal, the measurement report including results of measurement of a cell reference signal, based on the measurement report, determine to cause the first user terminal to perform the D2D communication, perform a process for starting the D2D communication performed between the first user terminal and a second user terminal, receive a first data amount notification transmitted from the first user terminal, wherein the first data amount notification indicates an amount of first data to be transmitted from the first user terminal to the second user terminal, and based on the first data amount notification, allocate first radio resources to the first user terminal, wherein the first radio resources allocated to the first user terminal are used by the first user terminal to transmit the first data.

6. The device according to claim 5, wherein the at least one processor is further configured to cause the base station to:

receive a second data amount notification transmitted from the first user terminal, wherein the second data amount notification indicates an amount of remaining first data to be transmitted from the first user terminal to the second user terminal, and based on the second data amount notification, allocate second radio resources to the first user terminal, wherein the second radio resources allocated to the first user terminal are used by the first user terminal to transmit the remaining first data.

* * * * *